(12) United States Patent
Susaki et al.

(10) Patent No.: US 11,397,927 B2
(45) Date of Patent: Jul. 26, 2022

(54) ELECTRONIC RECEIPT SYSTEM, ELECTRONIC RECEIPT MANAGEMENT SERVER, AND PROGRAM THEREFOR

(71) Applicant: TOSHIBA TEC KABUSHIKI KAISHA, Tokyo (JP)

(72) Inventors: Akiko Susaki, Tokyo (JP); Shinya Takakura, Shizuoka (JP); Hiroaki Imai, Osaka (JP); Kunihiro Yamada, Osaka (JP); Masayoshi Nakatani, Shizuoka (JP); Takamitsu Mukunashi, Aichi (JP); Tsuyoshi Gotanda, Tokyo (JP); Keiko Akamine, Kanagawa (JP); Yuko Takahashi, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 334 days.

(21) Appl. No.: 16/773,771

(22) Filed: Jan. 27, 2020

(65) Prior Publication Data
US 2020/0160287 A1    May 21, 2020

Related U.S. Application Data

(60) Continuation of application No. 15/596,619, filed on May 16, 2017, now abandoned, which is a division of
(Continued)

(30) Foreign Application Priority Data

Mar. 1, 2013   (JP) ................................ 2013-041289

(51) Int. Cl.
*G06Q 20/04* (2012.01)
*G06Q 30/04* (2012.01)
(Continued)

(52) U.S. Cl.
CPC ........... *G06Q 20/047* (2020.05); *G06Q 20/20* (2013.01); *G06Q 20/202* (2013.01); *G06Q 30/04* (2013.01); *G07G 5/00* (2013.01)

(58) Field of Classification Search
CPC ...... G06Q 20/20; G06Q 20/202; G06Q 30/04; G07G 5/00
See application file for complete search history.

(56) References Cited

U.S. PATENT DOCUMENTS

| 5,915,022 A | 6/1999 | Robinson et al. |
| 2009/0006151 A1 | 1/2009 | Zarghami et al. |

(Continued)

FOREIGN PATENT DOCUMENTS

| JP | 2003-123144 A | 4/2003 |
| JP | 2004-507842 A | 3/2004 |
| JP | 2007-316750 A | 12/2007 |

*Primary Examiner* — Allen C Chein
(74) *Attorney, Agent, or Firm* — Kim & Stewart LLP

(57) ABSTRACT

According to an embodiment, a system for dynamically generating user interfaces for electronic receipts is disclosed. An electronic receipt management server receives and stores a first electronic receipt generated for a transaction made by a customer at a physical store, a customer identifier, and first additional information unique to the physical store. The server receives and stores a second electronic receipt for a transaction made by the customer at an online store, the customer identifier, and second additional information unique to the online store. The server transmits the first and second electronic receipts, the customer identifier, and the first and second additional information, in response to an inquiry containing the customer code. A client device displays a first graphical user interface including a first selectable object to view an image of the first electronic receipt and a second selectable object to view an image of the second electronic receipt.

16 Claims, 18 Drawing Sheets

Related U.S. Application Data application No. 14/194,542, filed on Feb. 28, 2014, now abandoned.

(51) Int. Cl.
*G06Q 20/20* (2012.01)
*G07G 5/00* (2006.01)

(56) References Cited

U.S. PATENT DOCUMENTS

| | | |
|---|---|---|
| 2012/0084164 A1 | 4/2012 | Hammad et al. |
| 2012/0290609 A1 | 11/2012 | Britt |
| 2013/0046591 A1 | 2/2013 | Yao |
| 2013/0132234 A1 | 5/2013 | Grossi et al. |
| 2014/0122274 A1* | 5/2014 | Argue .................. G06Q 20/20 705/24 |

* cited by examiner

US 11,397,927 B2

ELECTRONIC RECEIPT SYSTEM, ELECTRONIC RECEIPT MANAGEMENT SERVER, AND PROGRAM THEREFOR

CROSS-REFERENCE TO RELATED APPLICATIONS

This application is a continuation of U.S. patent application Ser. No. 15/596,619, filed on May 16, 2017, which is a division of U.S. patent application Ser. No. 14/194,542, filed on Feb. 28, 2014, which is based upon and claims the benefit of priority from Japanese Patent Application No. 2013-162604, filed on Aug. 5, 2013, and Japanese Patent Application No. 2013-041289, filed on Mar. 1, 2013; the entire contents of each of which are incorporated herein by reference.

FIELD

Embodiments described herein relate generally to an electronic receipt system, an electronic receipt management server, and a program therefor.

BACKGROUND

In general, an electronic receipt system is known, by which a non-printed receipt is electronically transmitted from a merchant store transmitting device to a mobile device of a consumer who has just completed a shopping transaction at the store (i.e., at the time of payment). Even in the case where the consumers purchase products by internet shopping, the electronic receipt may be issued to the consumer.

When the receipt is converted into electronic data in this manner, household account bookkeeping is automatically and electronically performed, and thus this is beneficial to consumers. Further, introduction of the electronic receipt may reduce consumption of receipt paper, and thus this is also beneficial to stores adopting the electronic receipt system.

In addition, it is also known that product sales promotion and advertisement can be performed by electronically attaching coupons associated with purchased products to the electronic receipt.

However, the electronic receipt systems are still introduced on a per company basis and by companies which are the sellers of goods or services. Therefore, the users of the electronic receipts may only enjoy the benefits of the electronic receipt system at stores of a company which has introduced the electronic receipt system. In addition, the electronic receipts issued by internet shopping companies are also introduced on a per company basis. Thus, it is desirable to promote a wider introduction of the electronic receipt system.

DETAILED DESCRIPTION

Embodiments provide an electronic receipt system, an electronic receipt management server and a program therefor, capable of promoting the further acceptance of electronic receipts in internet shopping.

In general, according to an embodiment, an electronic receipt system includes an electronic receipt collection management unit, an electronic receipt transmission unit, and an electronic receipt display unit. The electronic receipt collective management unit manages electronic receipt information which is obtained by digitizing sales information of a members' in-store shopping in association with a first code for identifying a customer, and manages sales information, which is associated with the second code, of a members' on-line shopping at a virtual store on a network as the electronic receipt information by associating the second code with the first code. The electronic receipt transmission unit transmits the electronic receipt information associated with the first code to an information processing apparatus associated with the first code. The electronic receipt display unit displays the electronic receipt information transmitted to the information processing apparatus by the electronic receipt transmission unit.

An embodiment will be described with reference to the accompanying drawings.

Figure 1:
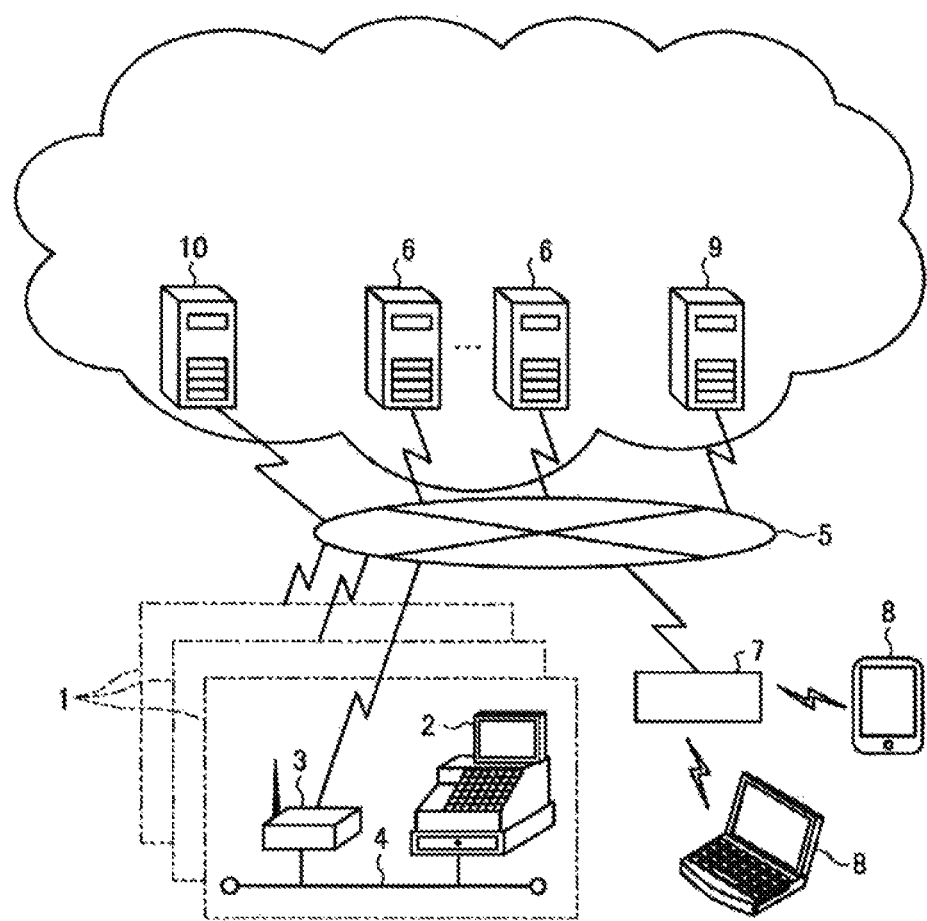
FIG. 1 is a configuration diagram showing a configuration of an electronic receipt system according to an embodiment.

FIG. 1 is a configuration diagram showing an entire configuration of an electronic receipt system according to the embodiment. As shown in FIG. 1, a Point of Sales (POS) terminal 2 which is a product sales data processing apparatus executing a product sales data process (only a single terminal is shown in FIG. 1, but a plurality of terminals may be used), and a router 3 are provided in a store 1. The POS terminal 2 and the router 3 are connected by a Local Area Network (LAN) 4 in the store. The router 3 is a device connecting the LAN 4 in the store with a network 5 which is the internet or a Virtual Private Network (VPN). In addition, although not specially shown, a store server which controls operation of the POS terminal 2 may be provided in the store 1.

Electronic receipt servers 6 are connected to the network 5. A plurality of electronic receipt servers 6 are provided, one for each of the companies that are sellers of products or services and operate convenience stores, supermarkets, food retailers, drug stores, apparel retailers, appliance stores, department stores, household goods stores, places to eat or chain stores (hereinafter referred to as stores), and each electronic receipt server 6 functions as a receipt management server for a company which stores and manages electronic receipt information according to a company code indicating the company that operates a store. In addition, the electronic receipt server 6 may be a headquarters server of a POS system having functions such as a sales management, a sales analysis, and an inventory management of each company that operates the store. Further, a plurality of online shopping servers 10 for electronic receipt are provided, one for each of the companies that are sellers of products or services and operate on-line shops that provide an internet shopping service, and function as receipt management servers for a company that stores and manages the electronic receipt information according to a company code indicating the company that operates an on-line shop.

Further, a mobile terminal 8 is connected to the network through a base station 7 which performs wireless communication according to the Wi-Fi standard or the like. The mobile terminal 8 is an information processing apparatus which has a web browser installed, for example, a smart phone, a mobile phone, a Personal Digital Assistant (PDA), a tablet computer, or the like. In addition, instead of the mobile terminal 8, an information processing apparatus such as a personal computer including a notebook computer may be used.

Further, the electronic receipt management server 9 which functions as a customer receipt management server that collectively stores and manages electronic receipt information for various types of companies that operate stores is also connected to the network 5. Consumers who are registered as members for the purpose of receiving the electronic receipt service may obtain the electronic receipt information from the electronic receipt management server 9 using the mobile terminal 8 through the network 5. For example, the electronic receipt management server 9 may be managed by a third party organization other than the company which manages the electronic receipt information in the electronic receipt server 6. In addition, the electronic receipt server 6 may be managed by the third party organization or the like. The function of the electronic receipt server 6 may be integrated into the electronic receipt management server 9 so that the server may be managed in one server. In addition, a function of collectively managing electronic receipt information for each company, by using a plurality of company codes, may be provided as a service (application) in a form of Software as a Service (SaaS) which is a type of a cloud computing.

In addition, member registration of a consumer for the purpose of receiving an electronic receipt service is executed, for example, in the following manner (not shown). The consumer transmits a blank (no content) email to a member management server (not shown) through the network 5 from the mobile terminal 8. The member management server transmits a Uniform Resource Locator (URL) representing a page for the member registration to the address of the received blank email. The consumer accesses the URL representing the page to establish a member registration using the mobile terminal 8, and inputs necessary items for the member registration on an input screen that is displayed on the mobile terminal 8. An input confirmation screen is displayed on the mobile terminal 8 after the input of the necessary items by the consumer is completed. Then, after the input confirmation by the consumer, member registration for a member is executed. Thereafter, the member management server delivers a member registration completion email including a member code and a password to the mobile terminal 8. Through the above procedure, the member registration is completed. In addition, a "top screen display" button is provided on a registration completion screen J displayed on the mobile terminal 8, after the registration is completed. The mobile terminal 8 displays a top screen by the customer operating the "top screen display" button.

In the electronic receipt system of such a structure, electronic receipt information indicating the payment details, which are generated by performing a product sales data process in the POS terminal 2 in the store 1, is transmitted to the electronic receipt management server 9 through the electronic receipt server 6 over the network 5, and the electronic receipt information is transmitted from the electronic receipt management server 9 to the mobile terminal 8 of the member. The member may confirm the contents by causing the electronic receipt information to be displayed on the display unit of the mobile terminal 8. In addition, the electronic receipt management server 9 publishes the electronic receipt information on the Web. The mobile terminal 8 having a web browser installed therein may download the electronic receipt information published on the web to the mobile terminal 8 by specifying and requesting a specific Uniform Resource Locator (URL), and may browse the information with the web browser. In addition, application software for browsing the electronic receipt information may be installed in the mobile terminal 8 to browse the electronic receipt information.

Figure 2:
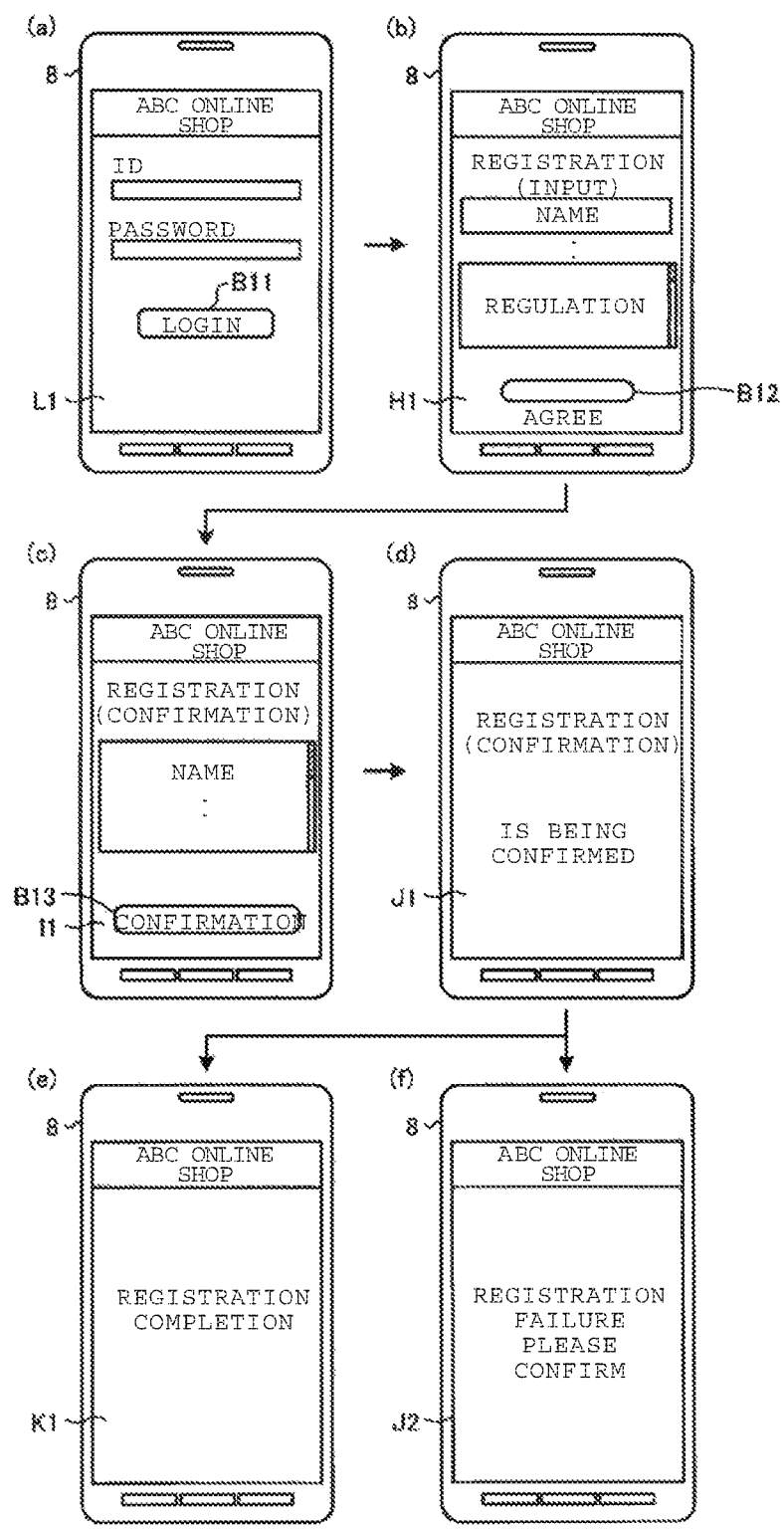
FIG. 2 is a transition diagram showing transition examples of screens for setting and registration of a consumer.

The mobile terminal 8 stores the member code and the password which are acquired by the consumer as described above in a storage unit 13 and the like (see (a) to (f) of FIG. 2). As an output method of the member code which is stored in this manner, there is displaying a bar code, displaying a two-dimensional code, transmission of the information through information communication by Near Field Communication (NFC) which is near-field type wireless communication, and the like.

Next, an operation example of an association of the member code that is acquired by the consumer for the purpose of receiving an electronic receipt service and the internet shopping member code of the on-line shop that provides the internet shopping service will be explained.

(a) to (f) of FIG. 2 are transition diagrams showing transition examples of screens for setting and registration of a consumer.

(1) First, the consumer accesses a specific URL from the mobile terminal 8 of the consumer, or accesses the on-line shop from which the consumer wants to receive the electronic receipt service by the application that is installed on the mobile terminal 8. When the consumer accesses the on-line shop, the mobile terminal 8 displays an on-line shop login screen L1 for the consumer to input the member code and password of the on-line shop (see (a) of FIG. 2). Once the member code and password are entered, the consumer logs in to the on-line shop by pressing a "Login" button B11.

(2) Then, the consumer accesses a page for registration of the member code with the on-line shop to establish electronic receipt service therewith by pressing a button (not shown) displayed on the mobile terminal 8. When the consumer accesses the page, the mobile terminal 8 displays an input screen H1 for inputting the user name, the member code, the password and the like of the electronic receipt service (see (b) of FIG. 2).

(3) When the consumer presses an "agree on the regulation, and proceed to the next" button B12 after the consumer inputs the registration contents such as the user name, the member code, and the password of the electronic receipt service, the mobile terminal 8 displays an input confirmation screen I1 (see (c) of FIG. 2). When the consumer presses a "confirmation" button B13 after the consumer confirms the registration contents, the mobile terminal 8 transmits the registration contents to the member management server.

(4) When the registration contents is transmitted, the mobile terminal 8 displays a registration confirmation screen J1 to let the consumer know that the registration contents is being confirmed (see (d) of FIG. 2). The member management server which receives the registration contents inquires whether the member of the registration contents which is input through the input screen H1 is registered, and transmits the result of the inquiry to the mobile terminal 8.

(5) When the member is registered in the member management server, the mobile terminal 8 transmits to the electronic receipt management server 9, the company code, the user name, the member code, the password and the like of the on-line shop to which the consumer was logged-in. Thus, the association of the member code acquired for the purpose of receiving the electronic receipt service and the member code of the on-line shop is performed. Then, the mobile terminal 8 displays a setting completion screen K1 to let the consumer know that the setting and registration is completed (see (e) of FIG. 2).

(6) In contrast, when the member is not registered in the member management server, the mobile terminal 8 displays a registration failure screen K2 to request the consumer to confirm the input information (see (f) of FIG. 2).

In the manner described above, the member code and the internet shopping member code are associated. By the association, the electronic receipt management server 9 manages not only the electronic receipt information of the products purchased in the store but also the electronic receipt information of the products purchased by internet shopping. Further, when the above setting is performed once, there is no need to perform the setting again the next time the consumer shops at the same on-line location.

Further, the association of the member code acquired by the consumer for the purpose of receiving the electronic receipt service and the existing company member card such as a point service or customer loyalty scheme operated by a company such as a chain store may be realized in the POS terminal 2 of each retail store or in each individual mobile terminal 8.

Here, an operation example of the association of the member code acquired by the consumer and the existing company member card as described above will be described.

1. The operation example in the POS terminal 2 of the store (1) First, a checker who operates the POS terminal 2 confirms whether or not to perform the electronic receipt service at the time of product registration (payment), and the presence or absence of a point card. When the electronic receipt service is performed, the consumer presents the mobile terminal 8 and the point card.

(2) The checker reads respectively the member code stored in the mobile terminal 8 and the company member code of the point card. Here, the reading of the member code stored in the mobile terminal 8 is dependent on an I/O which is provided in the POS terminal 2, but the bar code, the two-dimensional code, or the NFC as described above is applied thereto.

(3) The POS terminal 2 transmits the member code and the company member code of the point card which are read in (2) to the electronic receipt management server 9.

(4) The electronic receipt management server 9 receives the information transmitted in (3). When it is the first time that the electronic receipt information indicating the contents of the payment which is generated by performing a product sales data process in the POS terminal 2 of the store 1 using the point card, the member code, and the company member code of the point card are transmitted simultaneously, the information and the member code become registered in the electronic receipt management server 9.

Thereafter, the consumer may receive the electronic receipt service and receive loyalty program points by presenting only the mobile terminal 8 or the associated point card.

2. An operation example in the mobile terminal 8

(1) First, the consumer accesses the specific URL from the mobile terminal 8 of the consumer, or logs-in to a point card registration menu using an application that is installed in the mobile terminal 8. The consumer inputs and selects the company that issued the point card to be registered. Then, the consumer inputs the company member code of the point card to be registered and transmits the registration contents to the electronic receipt management server 9 by pressing the registration button after confirming the number. In addition, the input of the company member code may be performed through manual input, camera photography, magnetic reading, or the like.

(2) The electronic receipt management server 9 receives the registration contents from the mobile terminal 8 in (1), inquires the customer information of each company, and returns a confirmation to the display screen of to the mobile terminal 8 of the consumer.

(3) The association of the member code of the electronic receipt system and the existing company member card is completed by the consumer confirming the displayed information returned from the electronic receipt management server 9 and pressing an agreement button on the display screen.

In the manner described above, by managing the service in the electronic receipt system and the service to give loyalty/rewards program points using the member code of a unique electronic receipt, it is possible to receive the loyalty/rewards program service through the electronic receipt system by presenting the point card in the stores which honor the point cards and by presenting the mobile terminal 8 in the stores which do not honor the point cards. As a result, the member code of the electronic receipt performs the role of a hub, i.e., an aggregating identity, associating respective company point/loyalty or reward program cards of each company.

A configuration of each part constituting the electronic receipt system of the present embodiment will be described, including the above described aspect.

Figure 3:
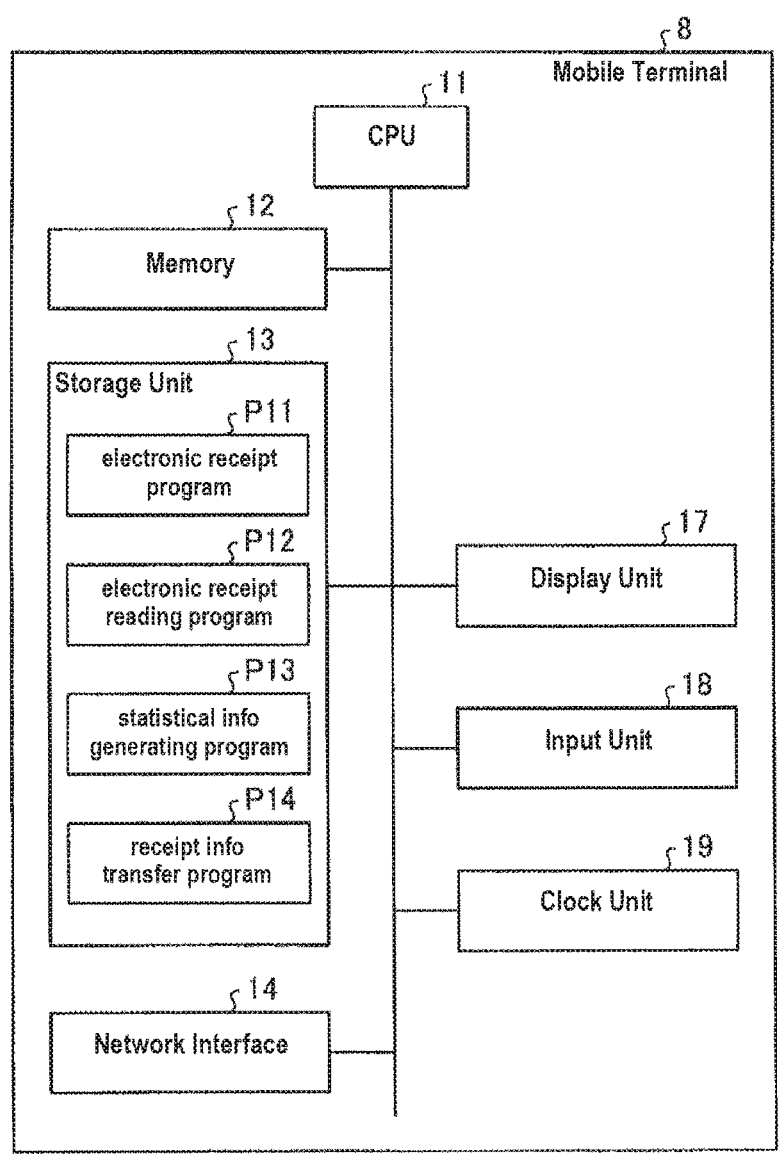
FIG. 3 is a block diagram showing a configuration of a mobile terminal.

First, a configuration of the mobile terminal 8 which is an information processing apparatus will be described using a block diagram of FIG. 3. As shown in FIG. 3, the mobile terminal 8 includes a Central Processing Unit (CPU) 11 functioning as a control unit, a memory 12 that temporarily stores data, a storage unit 13 from which reading is possible by an instruction from the CPU 11 and into which programs and data are stored, a network interface 14 connected to various public networks including the network 5, a display unit 17 capable of displaying various items of information, an input unit 18 for operating the mobile terminal 8, a clock unit 19 that tracks time, and the like. The input unit 18 is a touch panel laminated on the display unit 17 or keys provided on a case.

In addition to the web browser for browsing various items of information (content) published on the web, an electronic receipt corresponding program P11, for receiving from the electronic receipt management server 9 the electronic receipt information generated after the completion of payment by the product sales data process, and an electronic receipt browsing program P12 for browsing the received electronic receipt information, are pre-installed in the storage unit 13.

In addition, a statistical information generation program P13 for generating the statistical information obtained by statistically analyzing electronic receipt information that is received from the electronic receipt server 6 of each company to be described later based on the company code and the business type code, is installed in advance in the storage unit 13.

In addition, a receipt information transfer program P14 for parsing the electronic receipt information and transferring the information is installed in advance in the storage unit 13.

In addition, the electronic receipt corresponding program P11, the electronic receipt browsing program P12, the statistical information generation program P13, the receipt information transfer program P14 which are executed in the mobile terminal 8 are provided to the mobile terminal 8 as files in an installable format or in an executable format by being recorded in a computer-readable storage medium such as a CD-ROM, a flexible disk (FD), a CD-R, and a Digital Versatile Disk (DVD).

Further, the electronic receipt corresponding program P11, the electronic receipt browsing program P12, the statistical information generation program P13 and the receipt information transfer program P14 which are executed in the mobile terminal 8 may be stored in a computer connected to a network such as the internet so as to be provided to the mobile terminal 8 such as by being downloaded over a network. Further, the electronic receipt corresponding program P11, the electronic receipt browsing program P12, the statistical information generation program P13 and the receipt information transfer program P14 which are executed in the mobile terminal 8 may be provided or distributed to the mobile terminal 8 over a network such as the internet.

Figure 4:
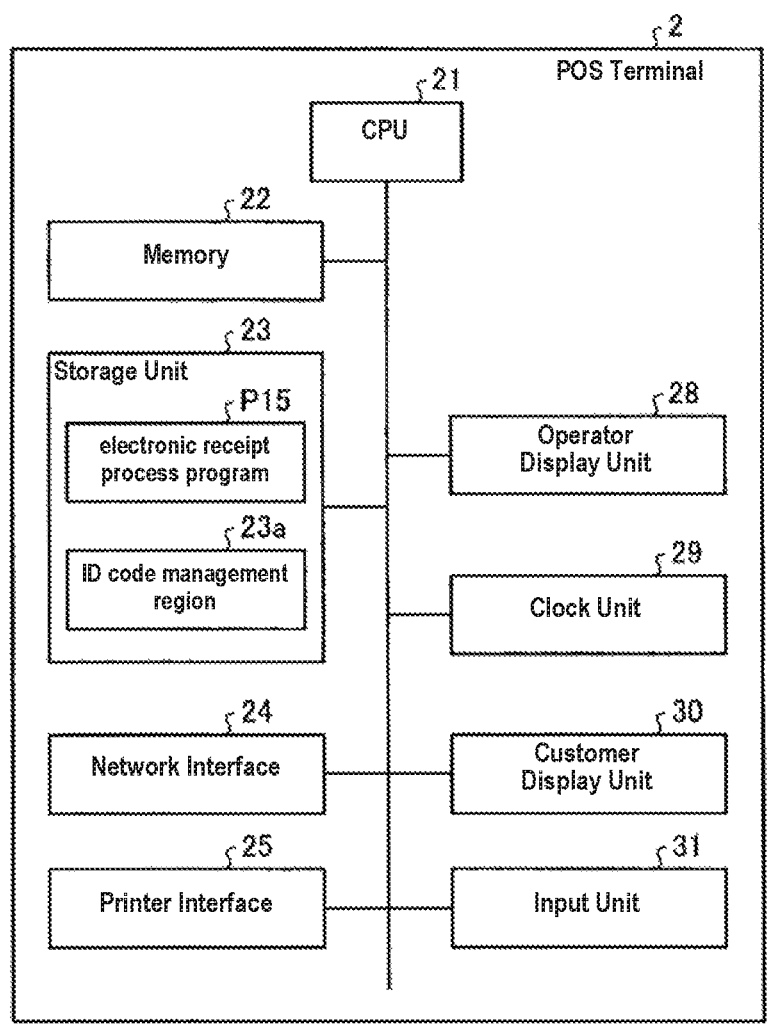
FIG. 4 is a block diagram showing a configuration of a POS terminal.

Subsequently, the configuration of the POS terminal 2, which is the product sales data processing apparatus, will be described using the block diagram of FIG. 4. As shown in FIG. 4, the POS terminal 2 includes a Central Processing Unit (CPU) 21 functioning as a control unit, a memory 22 that temporarily stores data, a storage unit 23 from which reading is possible by an instruction from the CPU 21 and into which programs and data are stored, a network interface 24 connected to the LAN 4 in the store, a printer interface 25 to which a printer is connected, an operator display unit 28 that displays various items of information for the operator, a clock unit 29 that tracks time, a customer display unit 30 that displays various items of information for the customer, an input unit 31 for operating the POS terminal 2 and the like.

In addition to the POS number of the POS terminal 2, an identification code management area 23a is secured in the storage unit 23, as an area for storing in advance a company code (identification code of a company that operates a store), a business type code, a store code indicating the store 1 having the POS terminal 2 installed, or the like. Here, the business type code is a code (classification code) for classifying business types of stores, as for example, convenience stores, supermarkets, department stores, pharmacies, restaurants, places to eat and drink, or the like. In addition, such business type may be changed arbitrarily by the user's preference. In addition, the company code (identification code of the company that operates the store) and the business type code may be registered in the electronic receipt server 6.

Further, in addition to software for executing various POS business operations including the product sales data process, an electronic receipt process program P15 for processing electronic receipt information obtained by an electronic processing rather than a printed receipt or a written receipt issued during the product sales data process, is pre-installed in the storage unit 23.

In addition, the electronic receipt process program P15 executed in the POS terminal 2 is provided as files of an installable format or in an executable format by being recorded in a computer-readable storage medium such as a CD-ROM, a flexible disk (FD), a CD-R, and a Digital Versatile Disk (DVD).

Further, the electronic receipt process program P15 executed in the POS terminal 2 may be stored in a computer connected to a network such as the internet so as to be provided to the POS terminal by being downloaded over a network. Further, the electronic receipt process program P15 executed in the POS terminal 2 may be provided or distributed thereto over a network such as the internet.

Figure 5:
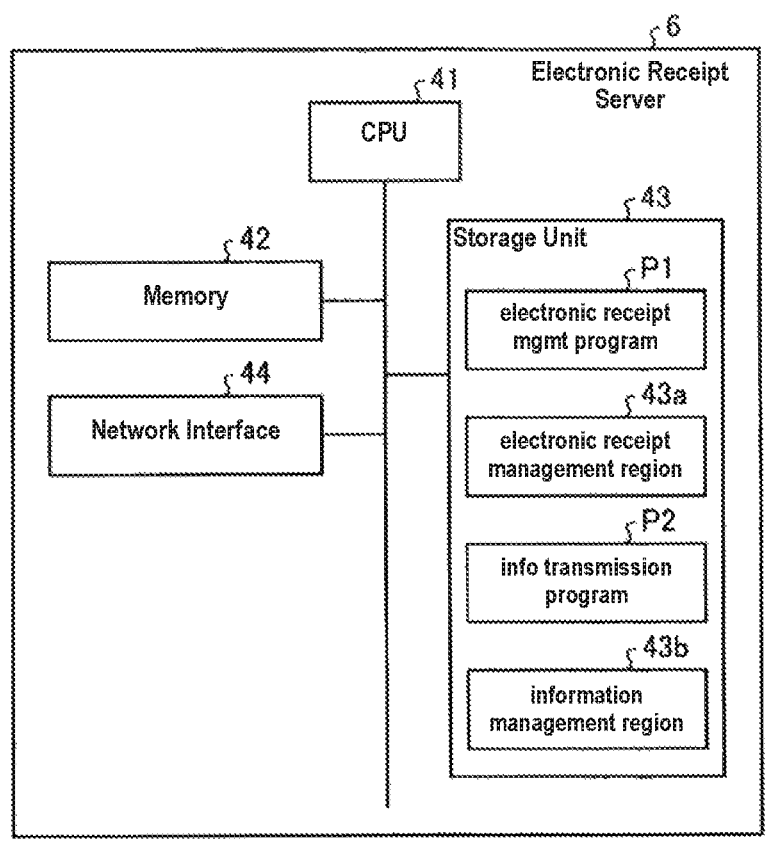
FIG. 5 is a block diagram showing a configuration of an electronic receipt server.

Hereinafter, the configuration of the electronic receipt server 6 which functions as a receipt management server for company will be described using the block diagram of FIG. 5. The electronic receipt server 6 includes a Central Processing Unit (CPU) 41 functioning as a control unit, a memory 42 that temporarily stores data, a storage unit 43 from which reading is possible by an instruction from the CPU 41 and into which programs and data are stored, a network interface 44 connected to the network 5, and the like.

An electronic receipt management area 43a as an area for storing electronic receipt information for each company that operates a store is secured in the storage unit 43. The electronic receipt information includes a company code (identification code of the company that operates the store), the business type code, a store code, a member code of consumers, a POS number of the POS terminal 2, a receipt number, product sales data, and the like.

Further, the electronic receipt management program P1 for managing the electronic receipt information received from the POS terminal 2 of each store 1 in the electronic receipt management area 43a is pre-installed in the storage unit 43.

Further, the information transmission program P2 for transmitting the electronic receipt information, to the electronic receipt management server 9, which is managed in the electronic receipt management area 43a, is pre-installed in advance in the storage unit 43.

Further, an information management area 43*b* for storing various items of additional information which is associated with a desired product, a member, a company, and a store is provided in the storage unit 43. Here, the additional information includes access information such as a URL to link to a website associated with a campaign of a company, a URL to link to a website associated with a commercial of a company, and a URL to link to a coupon of a company.

The electronic receipt management program P1 and the information transmission program P2 which are executed in the electronic receipt server 6 may be provided thereto as files of an installable format or in an executable format by being recorded in a computer-readable storage medium such as a CD-ROM, a flexible disk (FD), a CD-R, and a Digital Versatile Disk (DVD).

Further, the electronic receipt management program P1 and the information transmission program P2 which are executed in the electronic receipt server 6 may be stored in a computer connected to a network such as the internet so as to be provided to the server 6 by being downloaded over a network. Further, the electronic receipt management program P1 and the information transmission program P2 which are executed in the electronic receipt server 6 may be provided or distributed thereto over a network such as the internet.

Figure 6:
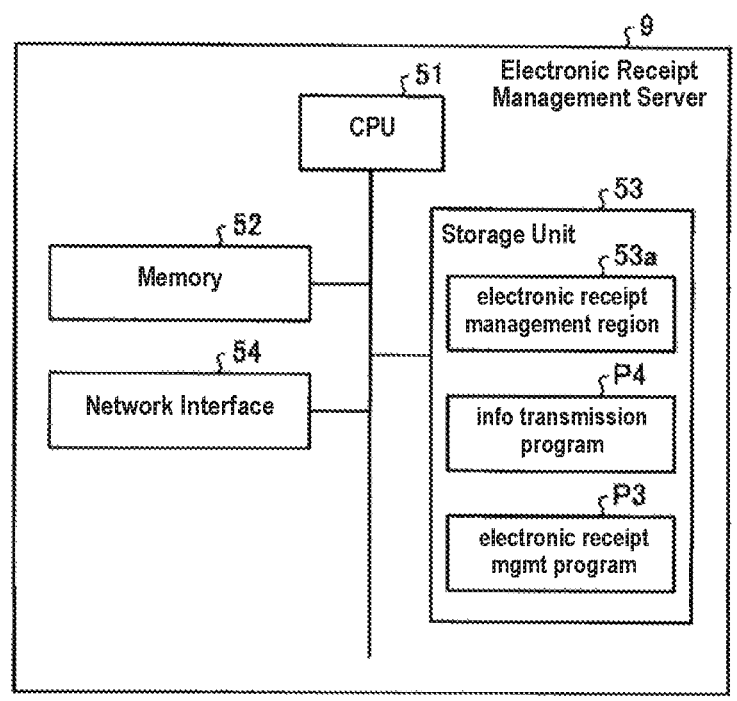
FIG. 6 is a block diagram showing a configuration of an electronic receipt management server.

Subsequently, the configuration of the electronic receipt management server 9 which functions as a customer receipt management server will be described using a block diagram of FIG. 6. The electronic receipt management server 9 includes a Central Processing Unit (CPU) 51 functioning as a control unit, a memory 52 that temporarily stores data, a storage unit 53 from which reading is possible by an instruction from the CPU 51 and into which programs and data are stored, a network interface 54 connected to the network 5, and the like.

An electronic receipt management area 53*a* is secured in storage unit 53, as an area for collectively storing the electronic receipt information of various companies that operate stores. More specifically, the electronic receipt management area 53*a* manages electronic receipt information and additional information for each member of various companies that operate stores. The electronic receipt information includes a member code, a company code (an identification code of a company which operates a store), a store code, a POS number of a POS terminal 2, a receipt number, product sales data, additional information and the like.

Further, the electronic receipt management program P3 for managing additional information and electronic receipt information which are received from the electronic receipt server 6 of each company in the electronic receipt management area 53*a* is pre-installed in the storage unit 53.

Further, the information transmission program P4 for transmitting the electronic receipt information, and additional information relating to the product purchased, to the mobile terminal 8 is pre-installed in the storage unit 53.

The electronic receipt management program P3 and the information transmission program P4, which are executed in the electronic receipt management server 9, may be provided thereto as files of an installable format or in an executable format by being recorded in a computer-readable storage medium such as a CD-ROM, a flexible disk (FD), a CD-R, and a Digital Versatile Disk (DVD).

Alternatively, the electronic receipt management program P3 and the information transmission program P4 which are executed in the electronic receipt management server 9 may be stored in a computer connected to a network such as the internet so as to be provided to the server 9 by being downloaded over a network. Further, the electronic receipt management program P3 and the information transmission program P4 which are executed in the electronic receipt management server 9 may be provided or distributed thereto over a network such as the internet.

An operation of each part constituting a system of the present embodiment will now be described.

First, an electronic receipt process executed by the CPU 21 of the POS terminal 2, operating according to the electronic receipt process program P15, will be described with reference to the functional block diagram shown in FIG. 7 and the flowchart shown in FIG. 8.

Figure 7:
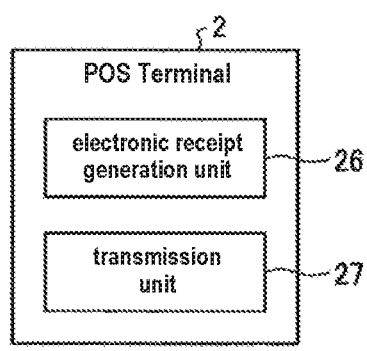
FIG. 7 is a functional block diagram relating to an electronic receipt process performed in the POS terminal.

As shown in FIG. 7, the electronic receipt process program P15 executed in the POS terminal 2 is configured as a module including the electronic receipt generation unit 26 functioning as the electronic receipt generation device and the transmission unit 27 functioning as the transmission device. In hardware, the CPU 21 reads and executes the electronic receipt process program P15 from the storage unit 23 so as to load each unit described above on the memory 22, and the electronic receipt generation unit 26 and the transmission unit 27 are generated on the memory 22.

The electronic receipt generation unit 26 generates electronic receipt information obtained by electronic processing in place of a printed or written receipt issued during the product sale process, which includes a company code indicating a company that operates a store, in association with the member code of consumer.

The transmission unit 27 transmits the electronic receipt information generated by the electronic receipt generation unit 26 to the electronic receipt server 6 that manages the electronic receipt information sorted by the company code.

Figure 8:
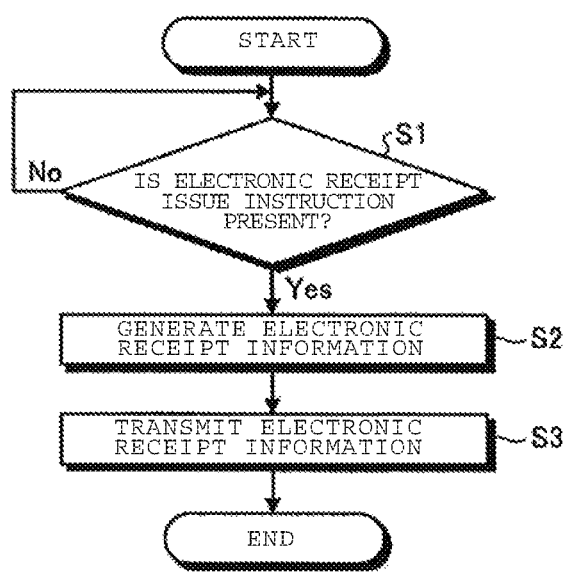
FIG. 8 is a flowchart showing a flow of the electronic receipt process.

As shown in FIG. 8, when there is an input of a decision operation key for starting the decision process of a product sale, the CPU 21 (electronic receipt generation unit 26) of the POS terminal 2 determines whether there is an input of the member code, confirmation of the presence or absence of the issued electronic receipt, and an electronic receipt issuing instruction corresponding to completion of the payment process according to a decision operation (step S1).

For example, a method shown below is followed in order for a member to give an electronic receipt issuing instruction.

1. A clerk operates an "electronic receipt issue" button provided in the input unit 31 (for example, a keyboard) of the POS terminal 2.

2. A consumer, who is a member, displays a bar code including a code on the display unit 17 of the mobile terminal 8, and the clerk reads out the code with the input unit 31 (for example, bar code scanner) of the POS terminal 2.

3. The consumer, who is a member, operates the "electronic receipt issue" button that is displayed in a manner of being able to be pressed on the customer display unit 30.

4. The consumer, who is a member, displays the bar code including the code on the display unit 17 of the mobile terminal 8, and the consumer, who is a member, in person reads out the code with the input unit 31 (for example, bar code scanner (a scanner separate from the scanner used in product registration is preferable)) of the POS terminal 2.

5. When the consumer, who is a member, presents a company member card for receiving a point service, the input unit 31 of the POS terminal 2 (for example, such as a bar code scanner, a magnetic card reader, or NFC) reads the company member code of the company member card. When the member code of the electronic receipt is associated with the company member code which is read, it is determined that there is an instruction to issue an electronic receipt.

When it is determined that there is the electronic receipt issue instruction (Yes in step S1), the CPU 21 (electronic receipt generation unit 26) of the POS terminal 2 transmits product sale data to a headquarter server, and separately from the product sale data, extracts a company code (identification code of the company that operates a store), a business type code, a store code, a member code of a consumer, a POS number of the POS terminal 2, a receipt number, product sales data, and the like from an identification code management area 23*a* provided in the storage unit 23, based on the information on products registered and information on payment at the time of payment by the product sales data process so as to generate the electronic receipt information (step S2).

Subsequently, the CPU 21 (transmission unit 27) of the POS terminal 2 connects to the LAN 4 in the store and the network 5 through the network interface 24, transmits the generated electronic receipt information to the electronic receipt server 6 (step S3), and thus terminates the process. In addition, when it is determined that there is no electronic receipt issue instruction, the CPU 21 prints and issues a paper receipt, transmits the product sale data to the headquarter server, and thus terminates the process.

Further, when the CPU 21 of the POS terminal 2 is in an offline state when the product sale data (transaction data) is transmitted to the headquarter server, the CPU 21 of the POS terminal 2 avoids a failure by implementing the following measures:

1. Automatic implementation of retry transmission
2. In the case of not being able to perform the measure corresponding to 1, store the product sale data (transaction data) until the network restoration and transmit the product sale data (transaction data) to the headquarter server after network restoration. In this case, the CPU 21 of the POS terminal 2 performs the display such as "the product sale data (transaction data) will be transmitted later" on the operator display unit 28.

Figure 9:
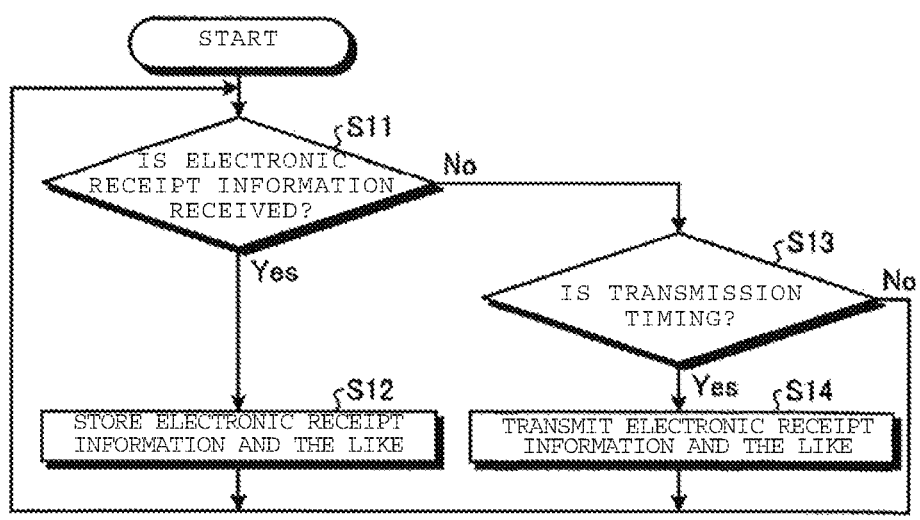
FIG. 9 is a flowchart showing a flow of an information transmission process in the electronic receipt server.

The flow of an electronic receipt management process executed by the CPU 41 of the electronic receipt server 6 operating according to the electronic receipt management program P1 and the flow of an information transmission process executed by the CPU 41 operating according to the information transmission program P2 will be described with reference to a flowchart shown in FIG. 9.

When the CPU 41 of the electronic receipt server 6 receives the electronic receipt information transmitted from the POS terminal 2 through the network interface 44 (Yes in step S11), the CPU 41 stores the received information as the electronic receipt information for each company in the electronic receipt management area 43*a* of the storage unit 43 (step S12). That is, the CPU 41 of the electronic receipt server 6 functions as electronic receipt management device for managing the electronic receipt information in the storage unit 43 categorized by the company code.

Further, after the CPU 41 of the electronic receipt server 6 stores the received electronic receipt information, when transmission timing is set in advance (No in step S11, Yes in step S13), the CPU 41 transmits to the electronic receipt management server 9 the additional information that is managed in the information management area 43*b* and the electronic receipt information that is managed in the electronic receipt management area 43*a* (step S14), and the process returns to step S11.

In addition, although the CPU 21 (electronic receipt generation unit 26) of the POS terminal 2 generates the electronic receipt information and transmits the electronic receipt information to the electronic receipt server 6, the operation of the CPU 21 is not limited thereto. For example, the CPU 21 of the POS terminal 2, based on the information on the registered product and information on payment at the time of payment by the product sales data process, may transmit a store code, a member code of a consumer, a POS number of the POS terminal 2, a receipt number, product sales data, and the like to the electronic receipt server 6, and the CPU 41 of the electronic receipt server 6 may add the company code, the business type code, and the like so as to generate electronic receipt information.

The flow of the electronic receipt management process executed by the CPU 51 of the electronic receipt management server 9 operating according to the electronic receipt management program P3 and the flow of the product information transmission process executed by the CPU 51 of the electronic receipt management server 9 operating according to the information transmission program P4 will now be described with reference to the functional block diagram shown in FIG. 10 and the flowchart shown in FIG. 11.

Figure 10:
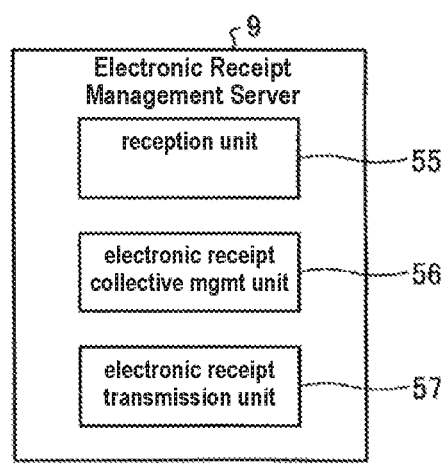
FIG. 10 is a functional block diagram relating to an electronic receipt management process and a product information transmission process performed in the electronic receipt management server.

As shown in FIG. 10, the electronic receipt management program P3 and the information transmission program P4 which are executed in the electronic receipt management server 9 are configured as a module including the reception unit 55 functioning as the reception means, an electronic receipt collective management unit 56 functioning as the electronic receipt collective management means, and an electronic receipt transmission unit 57 functioning as the electronic receipt transmission means. In actual hardware, the CPU 51 reads and executes the electronic receipt management program P3 and the information transmission program P4 from the storage unit 53 so as to load each unit described above on the memory 52. Further, a reception unit 55, the electronic receipt collective management unit 56, and the electronic receipt transmission unit 57 are generated on the memory 52.

The reception unit 55 receives electronic receipt information sorted by companies which includes a company code indicating the company that operates the store and is obtained by an electronic processing instead of by reading and recording information from a printed or written receipt issued during the product sales data process.

The electronic receipt collective management unit 56 stores and thus maintains the electronic receipt information sorted by company as received by the reception unit 55 in the electronic receipt management area 53*a* of the storage unit 53 and collectively manages the information.

The electronic receipt transmission unit 57 acquires electronic receipt information including at least one company code which is associated with the member code from the electronic receipt management area 53*a* and transmits the acquired information to the mobile terminal 8 associated with the member code of a predetermined consumer.

Figure 11:
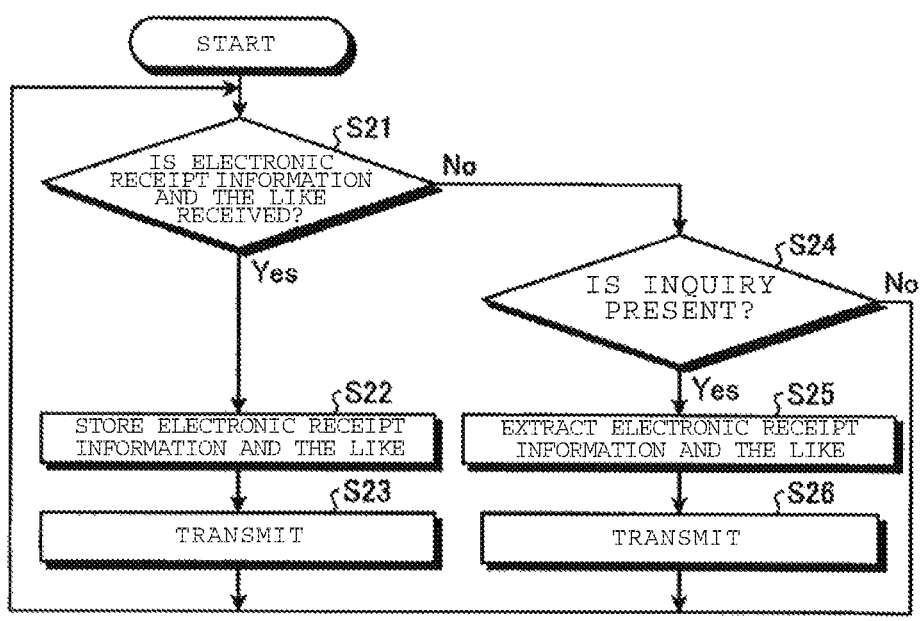
FIG. 11 is a flowchart showing flows of the electronic receipt management process and the product information transmission process.

As shown in FIG. 11, the CPU 51 (reception unit 55) of the electronic receipt management server 9 determines whether the electronic receipt information and the additional information are received through the network interface 54 (step S21) from the electronic receipt server 6 of each company.

When the electronic receipt information and the additional information are received (Yes in step S21), the CPU 51 (electronic receipt collective management unit 56) of the electronic receipt management server 9 collectively stores the electronic receipt information and the additional information of various companies in the electronic receipt management area 53*a* of the storage unit 53 (step S22).

In addition, the CPU 51 (electronic receipt transmission unit 57) of the electronic receipt management server 9 collectively stores the electronic receipt information and the additional information in the electronic receipt management area 53a. Thereafter, the CPU 51 transmits the electronic receipt information and the additional information to the mobile terminal 8 (step S23), and returns to step S21. Further, when the transmission of the electronic receipt information is completed, it is possible to manage or track the transmission of the electronic receipt information by storing a flag indicating the completion of the transmission in the electronic receipt information in the electronic receipt management area 53a.

Further, when there is an electronic receipt information inquiry from the mobile terminal 8 (No in step S21 and Yes in step S24), the CPU 51 (electronic receipt transmission unit 57) of the electronic receipt management server 9 extracts the additional information and the electronic receipt information which are managed in the electronic receipt management area 53a according to the contents of the electronic receipt information inquiry (step S25), then transmits the extracted contents to the mobile terminal 8 that performs the inquiry (step S26), and returns to step S21.

Subsequently, the flow of the electronic receipt receiving process executed by the CPU 11 of the mobile terminal 8 operating according to the electronic receipt corresponding program P11 and the flow of the electronic receipt browsing process executed by the CPU 11 operating according to the electronic receipt browsing program P12 will be described with reference to the functional block diagram shown in FIG. 12 and the flowchart shown in FIG. 13.

Figure 12:
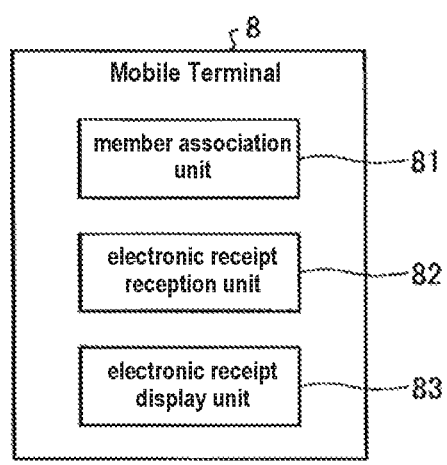
FIG. 12 is a functional block diagram relating to an electronic receipt receiving process and an electronic receipt browsing process performed in the mobile terminal.

As shown in FIG. 12, the electronic receipt corresponding program P11 and the electronic receipt browsing program P12 which are executed in the mobile terminal 8 are configured as a module including a member association unit 81 functioning as the member association means, an electronic receipt reception unit 82 functioning as the electronic receipt reception means, and an electronic receipt display unit 83 functioning as the electronic receipt display means. In actual hardware, the CPU 11 reads and executes the electronic receipt corresponding program P11 and the electronic receipt browsing program P12 from the storage unit 13 so as to load each unit described above on the memory 12. Further, the member association unit 81, the electronic receipt reception unit 82, and the electronic receipt display unit 83 are generated on the memory 12.

The member association unit 81 associates the electronic receipt information with the member code of a predetermined shopper.

The electronic receipt reception unit 82 receives the electronic receipt information including at least one company code associated with the member code from the electronic receipt management server 9 that collectively manages the electronic receipt information.

The electronic receipt display unit 83 arranges the electronic receipt information received by the electronic receipt reception unit 82 sorted by company code, and displays the electronic receipt information on the display unit 17.

Figure 13:
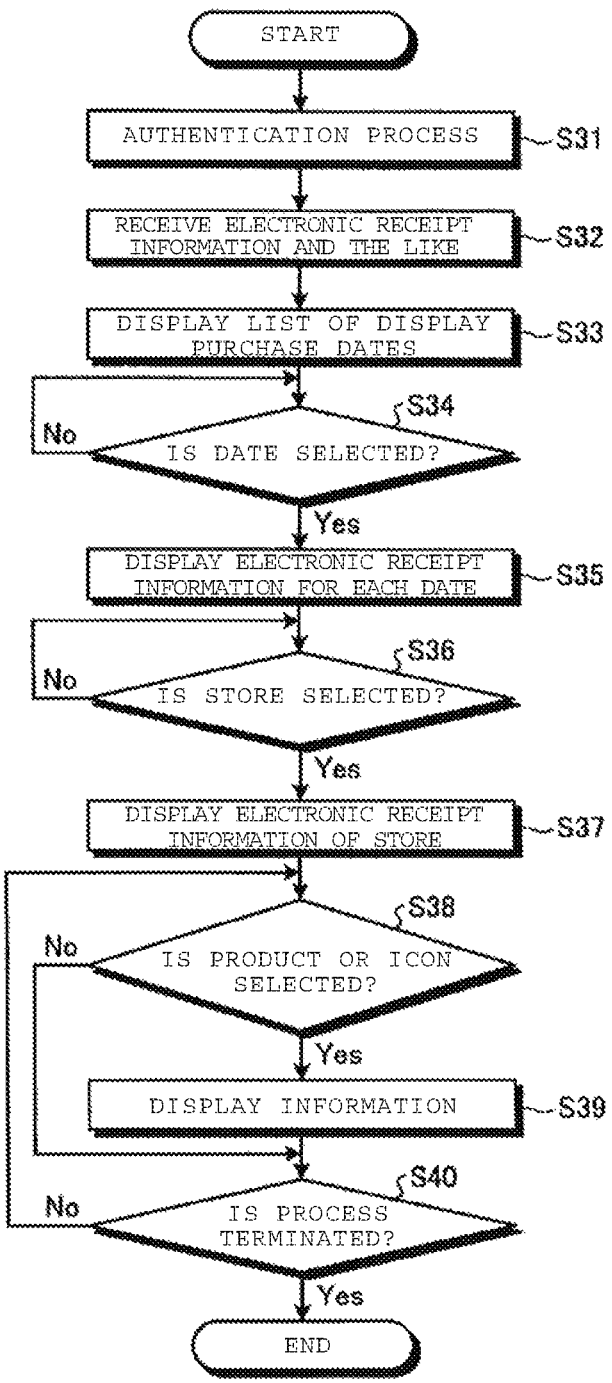
FIG. 13 is a flowchart showing flows of the electronic receipt receiving process and the electronic receipt browsing process.

As shown in FIG. 13, first, the CPU 11 (member association unit 81) of the mobile terminal 8 accesses the electronic receipt management server 9 and inputs the member code and the password so as to perform an authentication process (step S31). Thus, the mobile terminal 8 is associated with the member code of the predetermined consumer.

After the authentication, the CPU 11 (electronic receipt reception unit 82) of the mobile terminal 8 receives the additional information and the electronic receipt information which are managed in the electronic receipt management area 53a corresponding to the member code which was input (step S32). In addition, the additional information and the electronic receipt information may be received through an email.

Subsequently, the CPU 11 (electronic receipt display unit 83) of the mobile terminal 8 lists the purchase dates included in the electronic receipt information on the display unit 17 (step S33). By listing the purchase dates on the display unit 17 as described above, the mobile terminal 8 prompts the user who is a consumer to select information.

Figure 14:
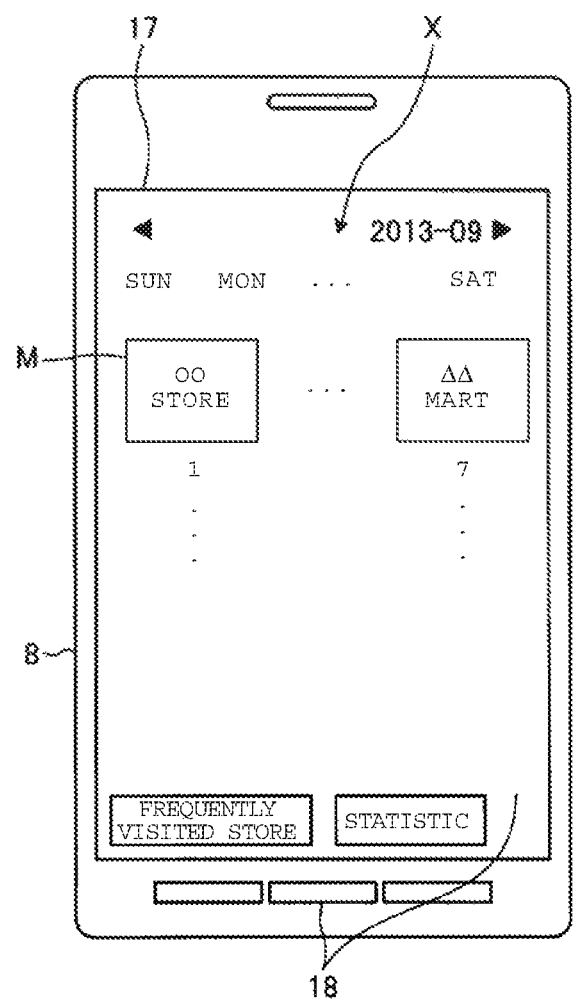
FIG. 14 is a front view showing a display example in the mobile terminal.

In addition, FIG. 14 is a modified example of a display example X. In the display example X shown in FIG. 14, by attaching marks M of the stores of the companies to the dates when the user in possession of the mobile terminal 8 which accesses the electronic receipt management server 9 purchased goods in stores of various companies, it is possible to intuitively find the store where the user buys goods. That is, according to the display example X shown in FIG. 14, it is possible to easily find the information indicating the store of which company the user frequently buys goods in. In addition, in order to display the mark M of the store, a table is prepared in which the mark is pre-associated with the company code that is included in the electronic receipt information.

When it is determined that the user taps the display and selects the desired date (Yes in step S34), the CPU 11 (electronic receipt display unit 83) of the mobile terminal 8 displays electronic receipt information corresponding to the selected date on the display unit 17 (step S35).

Figure 15:
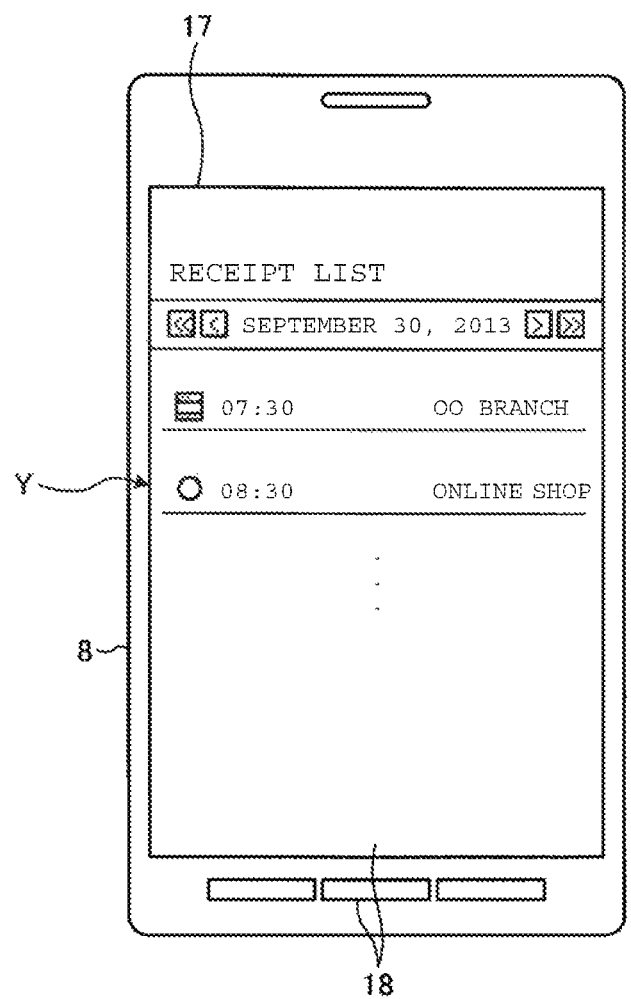
FIG. 15 is a front view showing a display example in the mobile terminal.

FIG. 15 is a front view showing a display example Y in the mobile terminal. As shown in FIG. 15, the display example Y lists the stores of various companies in which the user in possession of the mobile terminal 8 which accesses the electronic receipt management server 9 purchased goods on that date. More specifically, the display example Y displays the electronic receipt information in the chronological order in which the information was received, and displays the company mark, the trade time, the company name, and the store name. Further, the CPU 11 (electronic receipt display unit 83) of the mobile terminal 8 performs display in order for the user to be able to select the store corresponding to the desired date from the store information which is listed for each date using the curser following the input of the input unit 18. At this time, in a case of internet shopping, the CPU 11 (electronic receipt display unit 83) of the mobile terminal 8 displays, for example, "on-line shop" and the name of the on-line shop. Thus, it is known that the electronic receipt information is from the on-line shop.

When it is determined that the user selects a store on the desired date (Yes in step S36), the CPU 11 (electronic receipt display unit 83) of the mobile terminal 8 displays the electronic receipt information corresponding to the store of the selected date on the display unit 17 (step S37).

In addition, the screen display image does not necessarily need to be the receipt image. However, the electronic receipt information is an alternative to a paper receipt and electronic proof information of product purchase for proving that the product is purchased. In the display example Z, for use in the case of being presented as the proof of a product purchase in the store when there is a return, the following information is displayed.

Figure 16:
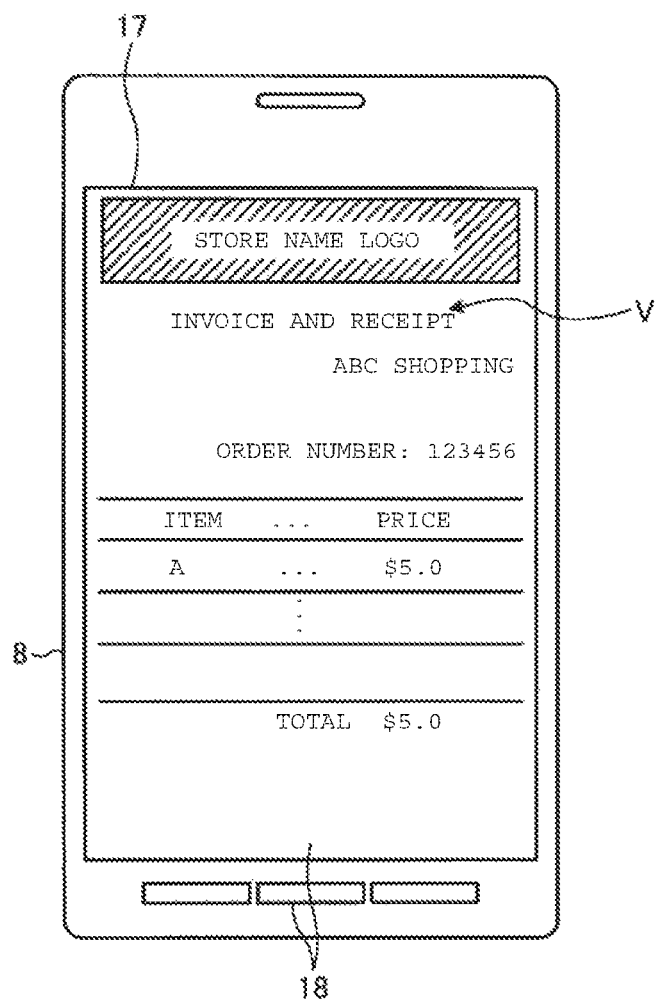
FIG. 16 is a front view showing a display example of an internet shopping in the mobile terminal.

Store name
    Purchased date
    Purchased product details
    Total sales amount Tendered amount of money
Change amount of money
Counter number
Trade number FIG. 16 is a front view showing a display example V of an example of internet shopping on the mobile terminal 8. As shown in FIG. 16, the display example V displays the electronic receipt information of a desired on-line shop in which the user has done internet shopping using the mobile terminal 8 of the user which accesses the electronic receipt management server 9. In internet shopping, a paper receipt is unlikely to be issued, and, instead, documents such as an invoice, a receipt or an invoice and receipt are likely to be issued. Thus, the electronic receipt information may be generated by analyzing the invoice and receipt or the like. Specifically, when the information regarding a sale such as the invoice and receipt is received, the electronic receipt server 6 extracts information necessary to form the electronic receipt information. The information necessary to form the electronic receipt information for internet shopping is, for example, product sales data including an on-line shop name, an on-line shop code, a member code of a consumer, an order number, purchase product details, and total sales amount, additional information, and the like. When the extraction of the information is performed, the electronic receipt server 6 generates the electronic receipt information from the information that is obtained by the extraction. Thus, the electronic receipt management server 9 manages as the electronic receipt information, information obtained by extracting the information regarding the sale such as the invoice and receipt. Then, when there is a display request of the electronic receipt information from the consumer, the mobile terminal 8 displays the generated electronic receipt information on the display unit.

The display example V shows the electronic receipt information that is generated from the invoice and receipts and has a layout similar to the paper invoice and receipt. In addition, documents such as the invoice, the receipt or the invoice and receipt may be received by e-mail.

In addition, there is no need that the screen display image have an invoice and receipt image. However, the electronic receipt information is intended to replace the paper invoice and receipt and is electronic proof information of product purchase for proving that the product was purchased. In the display example V, for use in the case of being presented as the proof information of product purchase in the store when there is a return, the following information is displayed. In addition, the information of the consumer, such as the name and the address of the consumer may be displayed in addition to the following information.

On-line shop name
On-line shop location
URL of the on-line shop
Contact address of on-line shop
Purchased product details
Delivery fee
Total sales amount
Payment method
Order date
Order number
Issue date of an invoice and receipt Here, the outline of a returns process will be described. As described above, the consumer is able to see the electronic receipt information in the past using the member code of the consumer as a key.

The process to return a product in the present embodiment is similar to the case of the return process using a paper receipt, and the return is performed by confirming the electronic receipt information displayed on the display unit 17 of the mobile terminal 8 as would be confirming the receipt information that is printed in advance, at the time of return.

1. The consumer causes the product to be returned together with the target electronic receipt information as displayed on the display unit 17 of the mobile terminal 8, and presents them to a physical store location from which the item was purchased, or a store location of a retailer having multiple store locations.

2. The clerk performs journal search based on the sales date and time, the counter number, and a sale number from the electronic receipt information that is presented and confirms the sale contents.

3. The clerk performs the return process by operating the POS terminal 2.

4. Since it is necessary to invalidate the original electronic receipt information after execution of the return process, the CPU 21 of the POS terminal 2 updates the electronic receipt information that is managed in the electronic receipt management area 43a of the electronic receipt server 6.

5. The CPU 21 of the POS terminal 2 issues electronic receipt information at the time of return.

6. In addition, the electronic receipt server 6 updates the electronic receipt information that is managed in the electronic receipt management area 53a of the electronic receipt management server 9 which functions as a customer receipt management server, and invalidates the original electronic receipt information. Thereafter, the electronic receipt server 6 updates the electronic receipt management area 53a of the electronic receipt management server 9 with the electronic receipt information at the time of return to be saved.

The return process in the present embodiment performs the return process pursuant to the requirements of each store, similar to the return process using a paper invoice and receipt, even when the product was purchased over the internet, and reflects that fact in the electronic receipt record. Subsequently, an operation example of the return process in the internet shopping will be explained.

1. The consumer informs the contact address described in the electronic receipt or the contact address described in the on-line shop of the product wanting to be returned, return reason, and the order number.

2. A clerk confirms the sale content from the order number and confirms whether the product meets the return conditions prescribed in the regulations of the store.

3. When a return condition is met, the consumer sends the product together with the document, i.e., an invoice, packing slip or other written indicia of the sale supplied by the seller to the consumer on which the order number is set forth to the on-line shop.

4. The clerk performs a journal search based on the order number described in the documentation sent to the consumer at the time of the sale of the product and confirms the sale content.

5. The clerk performs the return process by operating the POS terminal 2.

6. Since it is necessary to invalidate the original electronic receipt information after execution of the return process, the CPU 21 of the POS terminal 2 updates the electronic receipt information that is managed in the electronic receipt management area 43a of the electronic receipt server 6.

7. The CPU 21 of the POS terminal 2 issues electronic receipt information at the time of return.

8. In addition, the electronic receipt server 6 updates the electronic receipt information that is managed in the electronic receipt management area 53a of the electronic receipt management server 9 which functions as a customer receipt management server, and invalidates the original electronic receipt information. Thereafter, the electronic receipt server 6 updates and saves to the electronic receipt management area 53a of the electronic receipt management server 9 the electronic receipt information of the return.

Additional user selectable functions relating to a user for viewing purchasing information will now be described. If the user selects an appropriate product, or an icon associated with the product (Yes in step S38), the CPU 11 (electronic receipt display unit 83) of the mobile terminal 8 is connected to the network 5 through the network interface 14, and obtains from the network 5 various items of information based on the access information associated with the product or icon that is selected so as to be displayed on the display unit 17 (step S39).

For example, when a home page associated with the product as the access information for a product "a" is set as the product information link, when the desired product is selected by a user; the home page associated with the product is displayed on the display unit 17.

Further, when a home page associated with application campaign is set as the access information for an icon button "b" of "application", when the button of "application" is selected, an application campaign page associated with the button of "application" is displayed on the display unit 17.

Further, when a home page associated with a commercial is set as access information for the banner c which is a kind of icon, when the banner c is selected, the CM associated with the banner c is displayed on the display unit 17.

When the termination of the electronic receipt browsing process is declared by the input unit 18 (Yes in step S40), the CPU 11 of the mobile terminal 8 terminates the process.

When the termination of the electronic receipt browsing process is not declared by the input unit 18 (No in step S40), the CPU 11 of the mobile terminal 8 returns the process to step S38 and is on standby for the selection of the product or the icon associated with the product.

Figure 17:
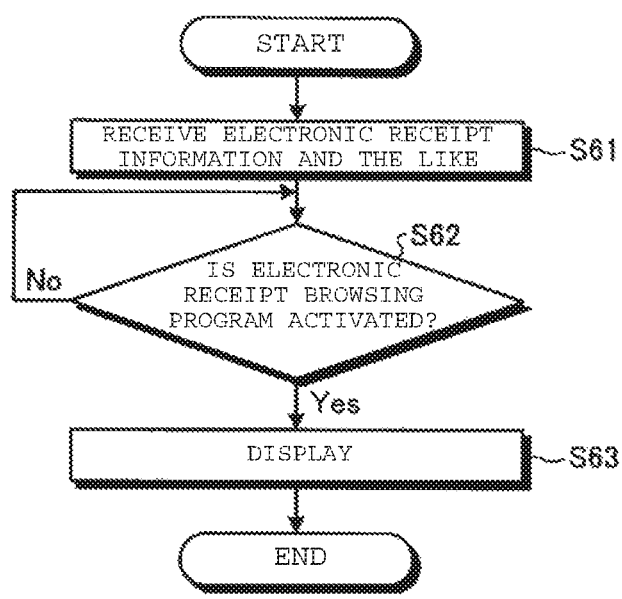
FIG. 17 is a flowchart showing flows of the electronic receipt receiving process and the electronic receipt browsing process.

In addition, as described in step S23 of FIG. 11 described above, not only a case the which the mobile terminal 8 accesses the electronic receipt management server 9, but the case in which the mobile terminal 8 receives the electronic receipt information and the additional information from the electronic receipt management server 9 is described referring to the flowchart of FIG. 17.

The CPU 11 (electronic receipt reception unit 82) of the mobile terminal 8 receives the electronic receipt information and the additional information from the electronic receipt management server 9 (step S61).

Thereafter, when the electronic receipt browsing program P12 is activated (Yes in step S62), the CPU 11 (electronic receipt display unit 83) of the mobile terminal 8 displays the received electronic receipt information and additional information in association with the company code (step S63).

Figure 18:
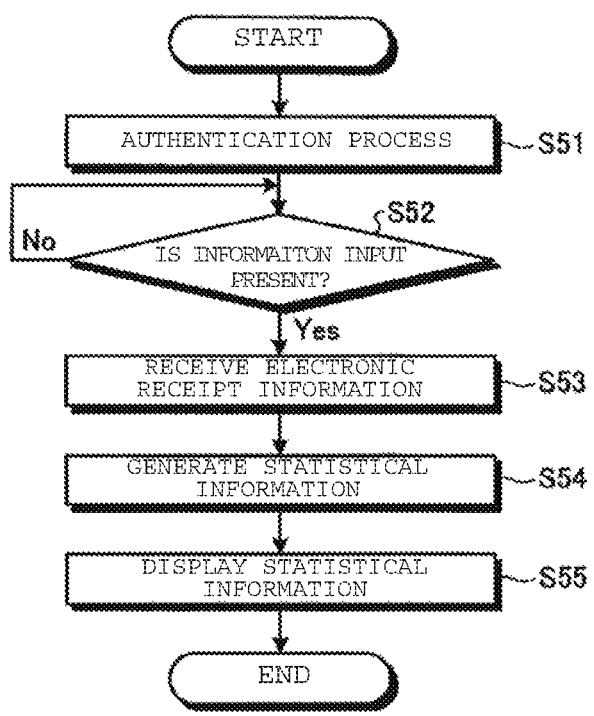
FIG. 18 is a flowchart showing a flow of a statistical information generation process performed in the mobile terminal.

Subsequently, the flow of a statistical information generation process executed by the CPU 11 of the mobile terminal operating according to the statistical information generation program P13 will be described referring to a flowchart shown in FIG. 18.

The CPU 11 of the mobile terminal 8 accesses the electronic receipt management server 9 and performs an authentication process by the input of the member code and password (step S51).

After the authentication, when it is determined that there is an input of information necessary to generate the statistical information, such as a time period for generating the statistical information and a type of the statistical information (Yes in step S52), the CPU 11 of the mobile terminal 8 receives the electronic receipt information that is managed in the electronic receipt management area 53a corresponding to the member code and the information necessary to generate the statistical information which are input (step S53).

Subsequently, the CPU 11 of the mobile terminal 8 generates statistical information obtained by analyzing statistically the acquired electronic receipt information, based on the information necessary to generate the statistical information (for example, a company code and business type code) (step S54), and displays the generated statistical information on the display unit 17 (step S55).

In addition, the electronic receipt information may be shared between different members sharing the access information of the electronic receipt system. By associating a plurality of member codes for example, the sales data of products purchased by each individual may be shared in a family, a group, a department of a company, or the like.

Thus, according to the electronic receipt system of the present embodiment, it is possible to introduce a mechanism for an electronic receipt for internet shopping, outside the company scope where an actual physical sales location for products exists, thereby facilitating the introduction of the electronic receipt.

Although the above embodiment describes the case where the internet is used in the operation of associating the member code of the electronic receipt service and the internet shopping member code, the function of associating is not limited thereto. For example, when there is no on-line shop but only a physical store location, a consumer presents their internet member code in an electronic receipt service and the member code of the electronic receipt service displayed on the mobile terminal 8 to a clerk. The clerk who receives the member codes inputs the internet shopping member code to the POS terminal 2. Thereafter, the clerk inputs a decision operation key for starting the decision process of product sale. Thus, the member code of the electronic receipt service and the internet shopping member code may be associated in the electronic receipt management server 9.

Alternatively, when there is a physical store location as well as an on-line shop, the clerk may issue a receipt attached with an URL in which registration is performed in association with the member code of the electronic receipt service, to a consumer without having the member code of the electronic receipt service. The consumer accesses and registers their information at the site of the URL presented from the mobile terminal 8 of the consumer, and thus the member code of the electronic receipt service and the internet shopping member code may be associated in the electronic receipt management server 9.

In addition, in the above embodiment, although there is provided a page for performing a setting and registration for the purpose of receiving an electronic receipt service in an on-line shop, the page for performing a setting and registration may not be in the on-line shop. For example, the page for performing a setting and registration may be provided in the electronic receipt management server 9. In this case, the consumer accesses the web page corresponding to the specific URL from the mobile terminal 8 of the consumer, or accesses a page for performing setting and registration by an application which is installed in the mobile terminal 8. In the page for performing setting and registration, the consumer designates an on-line shop from which the consumer wants to receive the electronic receipt service, and inputs the member code of the on-line shop, the password, and the like. After the confirmation of the content input by the consumer, the mobile terminal 8 transmits the information to the on-line shop and inquires whether or not the member "consumer" sending the information can be registered. Once the member has been registered, the electronic receipt management server 9 may perform the association of the member code which is acquired for the purpose of receiving the electronic receipt service and the member code of the on-line shop.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic receipt system comprising:
   an electronic receipt management server having data storage, a network interface and a processor configured to:
   receive, via a public network, a first electronic receipt generated by a point of sale (POS) terminal of a physical store for a transaction made by a customer at the physical store, a first member code, and first additional information unique to the physical store,
   store, in the data storage, the first electronic receipt in association with the first member code and the first additional information, when the first electronic receipt, the first additional information, and the first member code are received through the network interface over the public network,
   receive, via the public network, a second electronic receipt generated by an online store for a transaction made by the customer at the online store, a second member code, and second additional information unique to the online store,
   store, in the data storage, the second electronic receipt in association with the second member code and the second additional information, when the second electronic receipt, the second additional information, and the second member code are received through the network interface over the public network, and
   control the network interface to transmit the first and second electronic receipts and the first and second additional information, through the public network, in response to an inquiry containing the first member code, that is received through the network interface over the public network;
   a client device having a network interface and a processor configured to:
   control the network interface to transmit the inquiry containing the first member code through the public network,
   receive the first and second electronic receipts along with the first and second additional information, and control a display thereof to display a first graphical user interface (GUI) including a first selectable object to view an image of the first electronic receipt and a second selectable object to view an image of the second electronic receipt; and
   the point-of-sale terminal provided at the physical store, the point-of-sale terminal having a network interface and a processor configured to:
   output the first physical receipt to the customer with a Uniform Resource Locator (URL) included thereon by which the customer can access the electronic receipt management server when the physical store is associated with at least one online store, and
   output the first physical receipt to the customer without the URL included thereon when the physical store is not associated with at least one online store.

2. The system according to claim 1, wherein the processor of the client device is further configured to:
   output a request to associate the first member code and the second member code to a web site at the URL of the public network included in the physical receipt that is provided to the customer at the physical store.

3. The system according to claim 1, wherein the GUI includes a button that lists, when the button is touched by the customer, frequently visited physical stores and frequently visited online stores by the customer.

4. The system according to claim 1, wherein the GUI includes a button that lists, when the button is touched by the customer, statistics associated with purchases made by the customer in online stores and purchases made by the customer in physical stores within a predetermined time period.

5. The system according to claim 1, wherein the GUI includes a first button that lists, when the button is touched by the customer, frequently visited physical stores and frequently visited online stores by the customer, and wherein the GUI includes a second button that lists, when the button is touched by the customer, statistics associated with purchases made by the customer in online stores and purchases made by the customer in physical stores within a predetermined time period.

6. A method comprising:
   receiving, at a physical store as provided by a user, a product to be returned, together with an electronic receipt associated with the product to be returned;
   confirming, by a point-of-sale (POS) operator at the physical store, validity of a purchase made of the product to be returned;
   performing, by the POS operator at the physical store, a return process by at least one operation performed by the POS operator on a POS terminal located at the physical store;
   updating the electronic receipt associated with the product to be returned to indicate return of the product by the user; and
   electronically issuing, to the user via an electronic receipt management server, the updated electronic receipt.

7. The method of claim 6, further comprising:
   invalidating, by the electronic receipt management server, the electronic receipt associated with the product to be returned.

8. The method of claim 6, wherein the electronic receipt associated with the product to be returned is invalidated substantially at a same time when the updated electronic receipt is created and issued to the user.

9. The method of claim 6, wherein the confirming comprises:
   confirming the validity of a purchase made of the product to be returned by performing a journal search based on a date and time when the electronic receipt associated with the product to be returned.

10. The method of claim 7, wherein the updating comprises:
  receiving information, by the electronic receipt management server, via a network connection between the POS terminal and the electronic receipt management server, of the return process; and
  updating the electronic receipt associated with the product to be returned accordingly.

11. The method of claim 6, further comprising:
  obtaining, by the user based on a member code of the user, electronic receipt information of prior purchases made by the user; and
  determining, by the user, an electronic receipt associated with the product to be returned to the physical store based on the electronic receipt information of prior purchases made by the user.

12. The method of claim 6, wherein the product to be returned by the user was purchased by the user via a web site associated with the physical store, and was not purchased by the user at the physical store.

13. The method of claim 12, wherein the user purchased the product by accessing the web site via a network connection between a computing device of the user and the web site.

14. The method of claim 11, wherein the member code is associated with a particular store having a physical presence via the physical store and an online presence via a web site accessible via a network connection, that the user registered with via a registration transaction performed via a network connection to an electronic receipt system of which the electronic receipt management server is a component thereof.

15. The method of claim 6, further comprising:
  issuing to the user, by the POS terminal at substantially a same time that the electronic receipt is issued to the user, a paper receipt.

16. The method of claim 15, further comprising:
  printing, by the POS terminal on the paper receipt, a Uniform Resource Locator (URL) by which the user can access the electronic receipt management server via a network connection.

* * * * *

UNITED STATES PATENT AND TRADEMARK OFFICE
CERTIFICATE OF CORRECTION

| | |
|---|---|
| PATENT NO. | : 11,397,927 B2 |
| APPLICATION NO. | : 16/773771 |
| DATED | : July 26, 2022 |
| INVENTOR(S) | : Akiko Susaki et al. |

It is certified that error appears in the above-identified patent and that said Letters Patent is hereby corrected as shown below:

On the Title Page

Item (30) Foreign Application Priority Data, insert:
-- Aug. 5, 2013 (JP) ............................. 2013-162604 --
After
Mar 1, 2013 (JP) ............................. 2013-041289.

Signed and Sealed this
Twenty-fourth Day of September, 2024

Katherine Kelly Vidal
*Director of the United States Patent and Trademark Office*